United States Patent [19]
Van der Lely et al.

[11] 3,771,303
[45] Nov. 13, 1973

[54] DEVICE FOR WORKING CROP LYING ON THE GROUND

[76] Inventors: Cornelis Van der Lely, 7 Bruschenrain, Zug, Switzerland; Ary Van der Lely, 10 Weverskade, Maasland, Netherlands; Cornelis Johannes Gerardus Bom, 36 Esdoornlaan, Rozenburg, Netherlands

[22] Filed: June 1, 1970

[21] Appl. No.: 42,144

Related U.S. Application Data
[62] Division of Ser. No. 576,279, Aug. 31, 1966, Pat. No. 3,559,389.

[52] U.S. Cl. .................................................. 56/400
[51] Int. Cl. ............................................ A01d 77/00
[58] Field of Search ................. 56/377, 400, 370, 56/365, 366

[56] References Cited
UNITED STATES PATENTS

| | | |
|---|---|---|
| 2,860,478 | 11/1958 | van der Lely et al................. 56/377 |
| 2,908,130 | 10/1959 | van der Lely et al................. 56/377 |
| 3,447,295 | 6/1969 | van der Lely......................... 56/400 |
| 3,010,526 | 11/1961 | van der Lely et al............. 56/377 X |
| 3,120,092 | 2/1964 | van der Lely......................... 56/400 |
| 3,006,134 | 10/1961 | van der Lely et al................. 56/377 |
| 2,932,148 | 4/1960 | van der Lely et al................. 56/377 |
| 3,057,144 | 10/1962 | van der Lely et al................. 56/377 |

FOREIGN PATENTS OR APPLICATIONS

| | | |
|---|---|---|
| 107,702 | 3/1964 | Netherlands......................... 56/400 |
| 1,008,245 | 10/1965 | Great Britain....................... 56/400 |
| 94,491 | 10/1962 | Denmark.............................. 56/400 |
| 276,542 | 10/1964 | Netherlands......................... 56/400 |
| 450,792 | 4/1968 | Switzerland......................... 56/400 |

*Primary Examiner*—Russell R. Kinsey
*Attorney*—Mason, Mason and Albright

[57] ABSTRACT

A rake wheel that can be rotated about a non-horizontal axis having tines connected to the center of the wheel by torsionally deformable spokes. The deformable spokes are connected to a felly with the tine tips extending beyond the felly.

23 Claims, 26 Drawing Figures

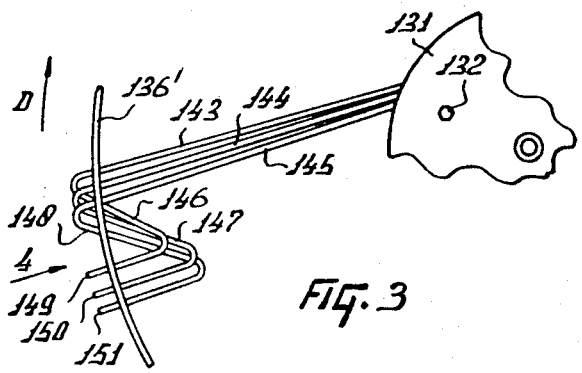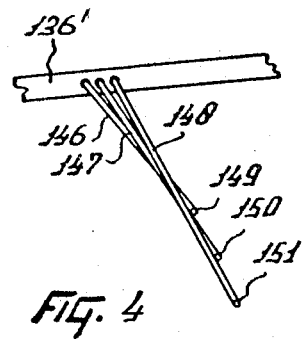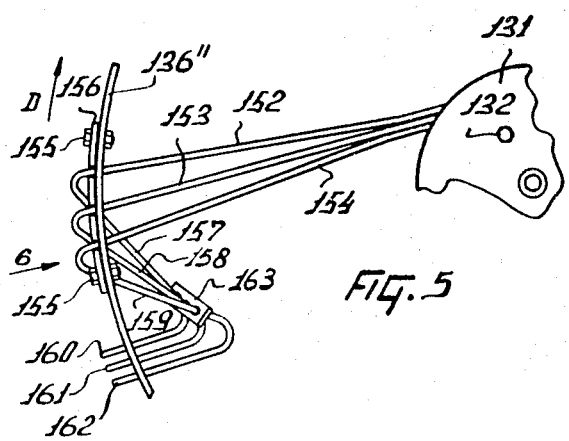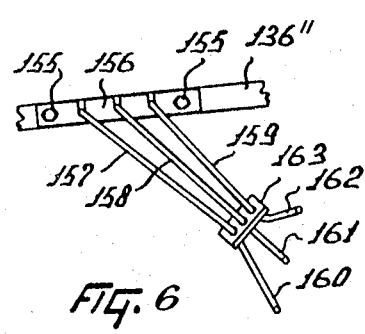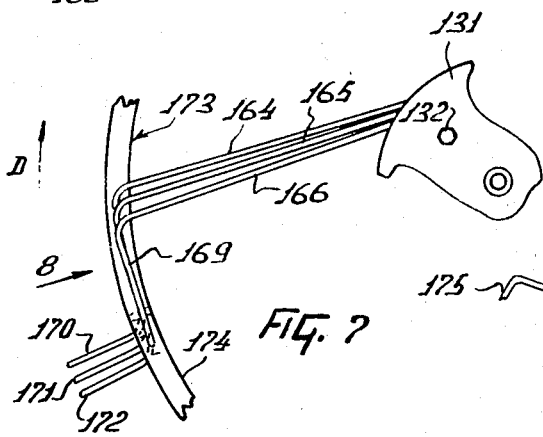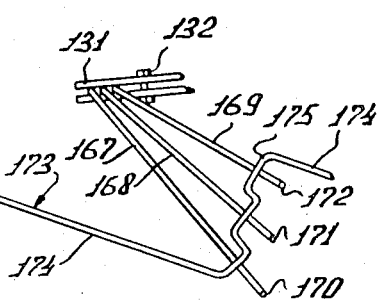

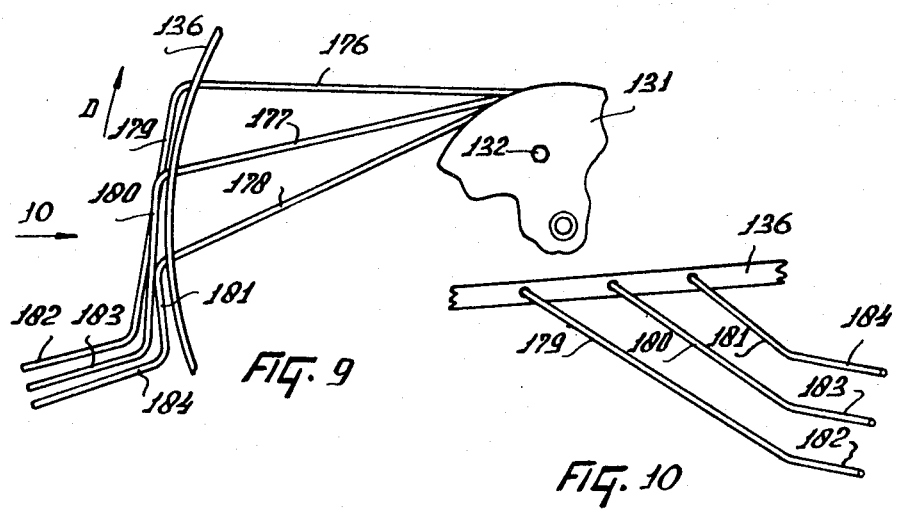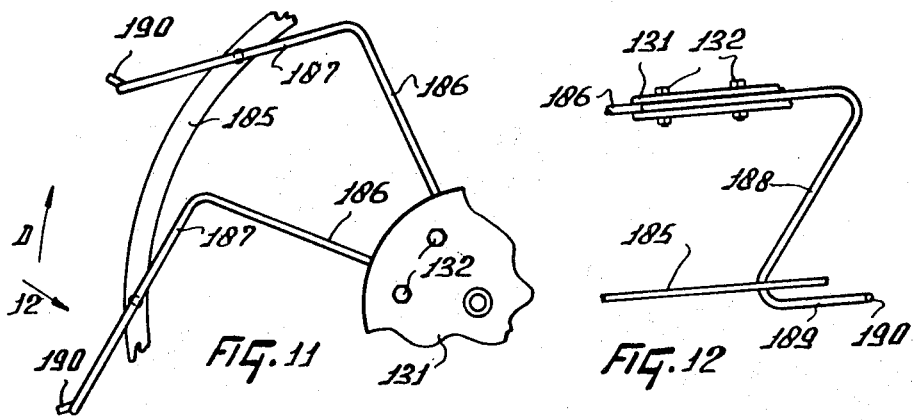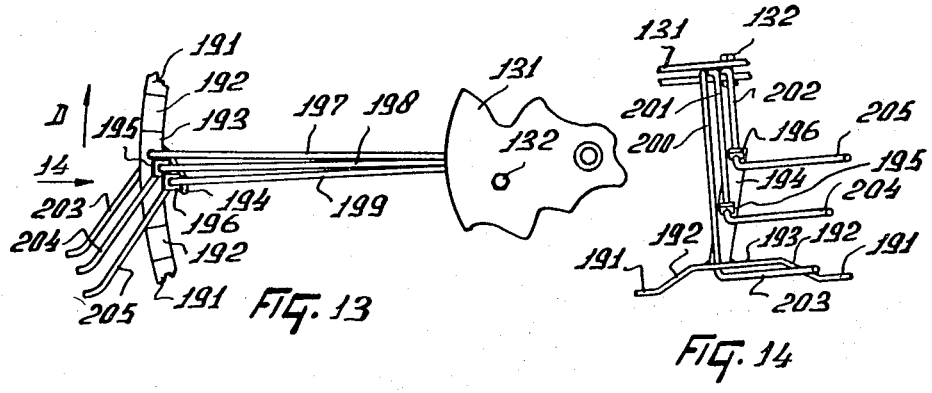

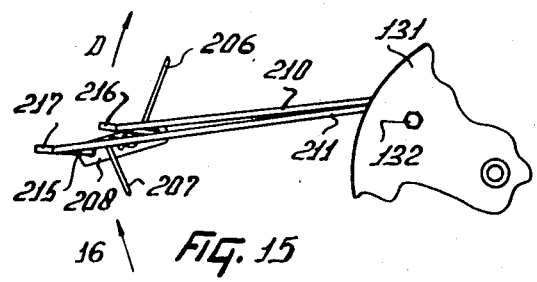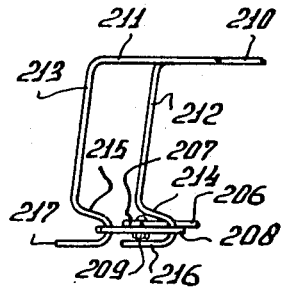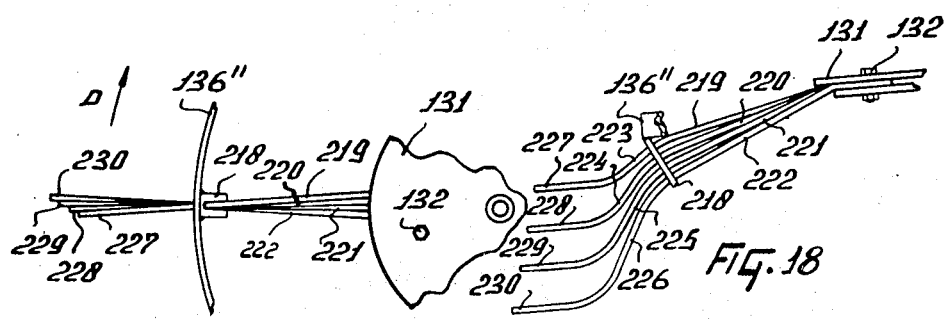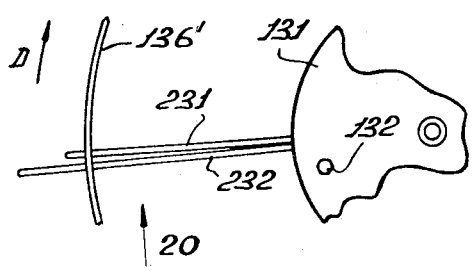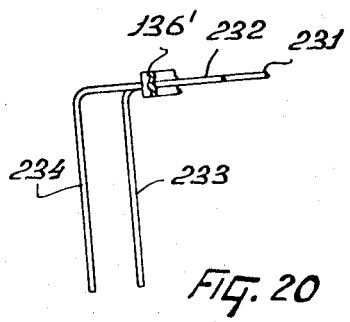

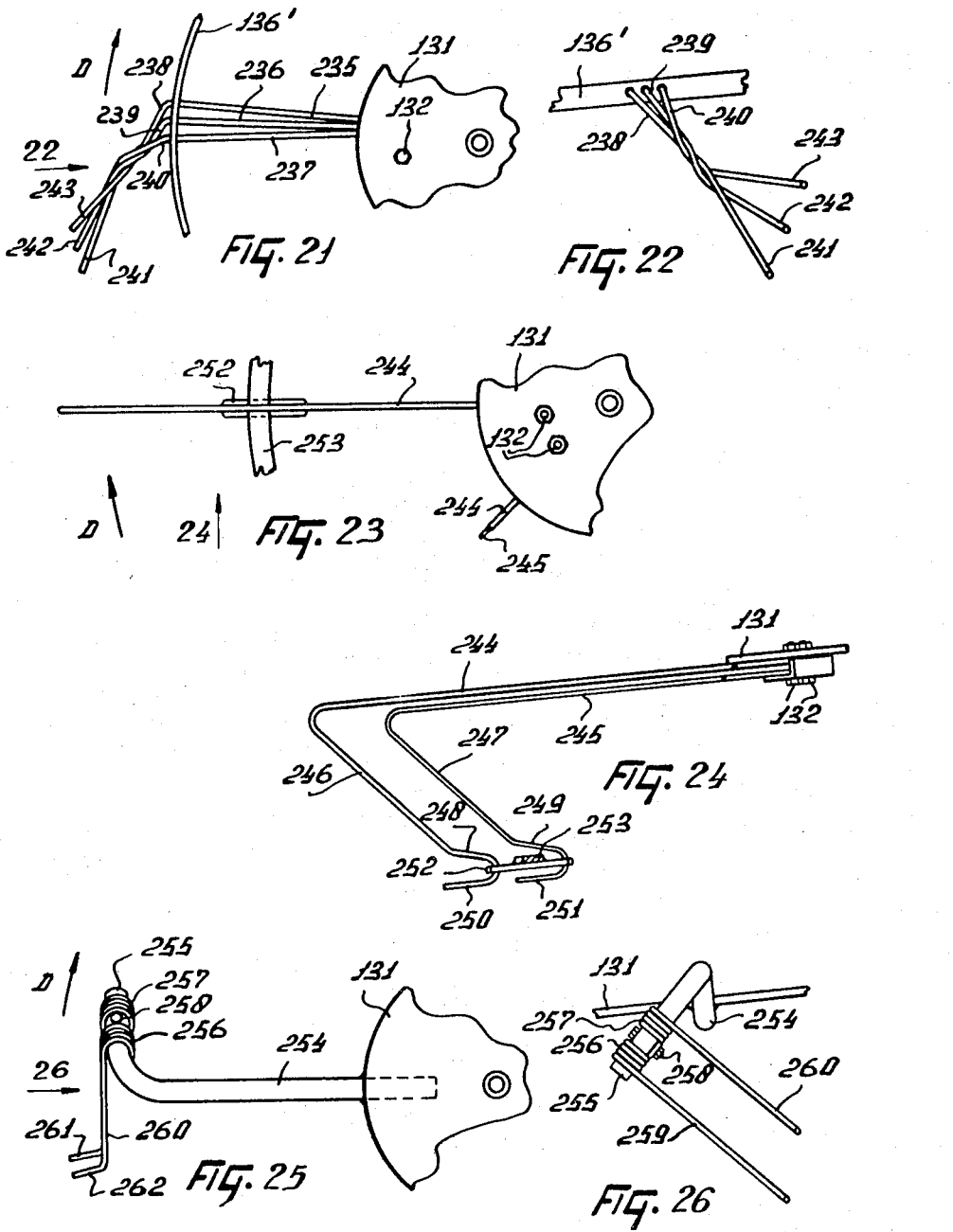

1

DEVICE FOR WORKING CROP LYING ON THE GROUND

This application is a division of application Ser. No. 576,279 filed Aug. 31, 1966 now U.S. Pat. No. 3,559,389.

BACKGROUND OF THE INVENTION

The invention relates to rake wheels, rake heads and like rake members of the kind that are adapted to be rotated about non-horizontal axes, such rake wheels incorporating tines that are connected to a central region of the rake wheel by torsionally deformable spokes.

An object of the invention is to improve the capacity of the tines to follow undulations in the surface of the ground during use of an implement incorporating a rake wheel in accordance with the invention.

According to the invention, there is provided a rake wheel of the kind set forth, wherein the tines are connected to the spokes by tine supports which extend downwardly from said spokes in an operative position of the rake wheel, each tine being inclined to the corresponding tine support. This also permits of obtaining a uniform, compact swath.

For a better understanding of the invention and the method by which the same can be performed, reference will now be made, by way of example, to the accompanying drawings, in which:

FIG. 1 is a plan view of a rake wheel or rake head in accordance with the invention, FIG. 2 is a fragmentary view as seen in the direction indicated by the arrow XV of FIG. 1, FIG. 3 is a fragmentary plain view of the FIG. 1 rake wheel with a different tine arrangement, FIG. 4 is a fragmentary view as seen in the direction XVII of FIG. 3, FIG. 5 is a fragmentary plan view of the FIG. 1 rake wheel with another tine arrangement, FIG. 6 is a fragmentary view as seen in the direction XIX of FIG. 5, FIG. 7 is a fragmentary view of the FIG. 1 rake wheel with a further tine arrangement, FIG. 8 is a fragmentary view as seen in the direction XXI of FIG. 7, FIG. 9 is a fragmentary view of the FIG. 1 rake wheel with a further tine arrangement, FIG. 10 is a fragmentary view as seen in the direction of XXIII OF FIG. 9, FIG. 11 is a fragmentary view of the FIG. 1 rake wheel with a further tine arrangement, FIG. 12 is a fragmentary view as seen in the direction of XXV OF FIG. 11, FIG. 13 is a fragmentary view of the FIG. 1 rake wheel with a further tine arrangement, FIG. 14 is a fragmentary view as seen in the direction of XXVII of FIG. 13, FIG. 15 is a fragmentary view of the FIG. 1 rake wheel with a further tine arrangement, FIG. 16 is a fragmentary view as seen in the direction of XXIX of FIG. 15;

FIG. 17 is a fragmentary view of the FIG. 1 rake wheel with a further tine arrangement;

FIG. 18 is a fragmentary view as seen in the direction of XXXI of FIG. 17,

Figure 1:
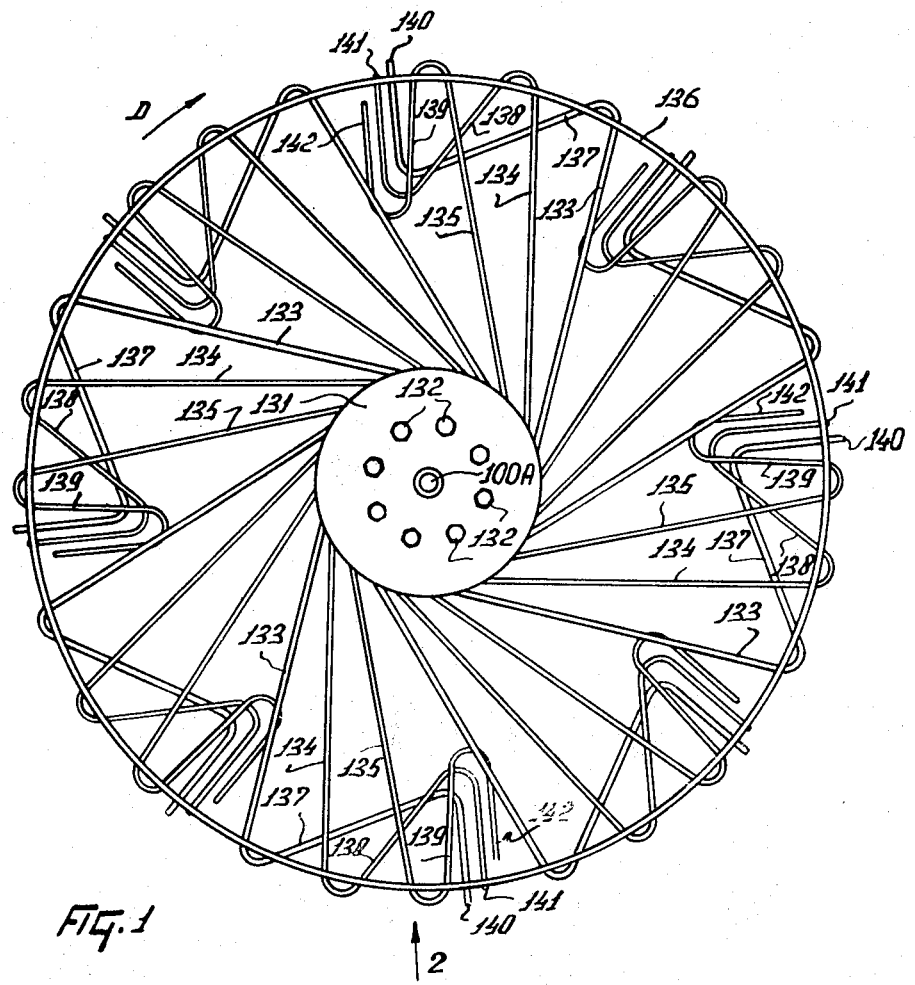

FIG. 19 is a fragmentary view of the FIG. 1 rake wheel with a further tine arrangement, FIG. 20 is a fragmentary view as seen in the direction of XXXIII of FIG. 19, FIG. 21 is a fragmentary view of the FIG. 1 rake wheel with a further tine arrangement, FIG. 22 is a fragmentary view as seen in the direction of XXXV of FIG. 21, FIG. 23 is a fragmentary view of the FIG. 1 rake wheel with a further tine arrangement, FIG. 24 is a fragmentary view as seen in the direction of XXXVII of FIG. 23, FIG. 25 is a fragmentary view of the FIG. 1 rake wheel with a further tine arrangement, FIG. 26 is a fragmentary view as seen in the direction of IXL of FIG. 25.

Figure 2:
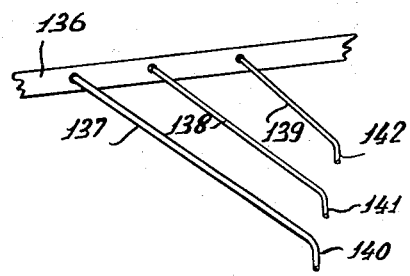

FIGS. 1 and 2 of the drawings illustrate one embodiment of a rake wheel or rake head which may be employed as one of the rake wheels or rake heads that are shown diagrammatically in the devices of Pat. No. 3,559,389. The rake wheel has a hub 131 which extends perpendicular to the normally substantially vertical axis of rotation which, in the example illustrated, is afforded by a shaft 100A corresponding to the shaft 100 in the above application. An annulus (not visible) is secured to the hub 131 by eight bolts 132 in such a way that the plane containing the annulus is substantially parallel to the plane containing the hub. The rake wheel has 24 spokes that are arranged in eight groups of three spokes each. The roots of each of the three spokes 133, 134 and 135 of each group are sandwiched in clamping relationship between the hub 131 and the aforementioned annulus, said spokes extending tangentially of an imaginary circle that is centered on the shaft 100A but which is of somewhat smaller diameter than the hub 131. The ends of the spokes 133, 134 and 135 that are remote from the hub 131 are entered through holes formed in a circular felly 136 and merge by way of curved portions into downwardly directed straight tine supports 137, 138 and 139 respectively. When viewed in a direction parallel to the axis of rotation of the rake wheel (FIG. 1) the angle which is contained between the spoke 133 and the tine support 137 is larger than that contained between the spoke 134 and the tine support 138 which angle, in turn, is larger than that contained between the spoke 135 and the tine support 139.

When a group of three spokes 133 to 135 and three tine supports 137 to 139 is viewed in a direction perpendicular to the axis of rotation of the rake wheel (FIG. 2) the three tine supports 137, 138 and 139 extend substantially parallel to one another, the ends thereof that are remote from the corresponding spokes 133, 134 and 135 being contained in a single plane which is parallel, or substantially parallel, to the axis of rotation of the rake wheel. The rake wheel illustrated in FIGS. 1 and 2 of the drawings is intended to be rotated in the direction indicated by the arrow D in FIG. 1 and it will be seen that the tine supports 137, 138 and 139 are inclined rearwardly relative to said direction from the felly 136. The three tine supports 137, 138 and 139 are also inclined inwardly towards the axis of rotation of the rake wheel from the felly 136 at different angles. The ends of the supports 137, 138 and 139 that are remote from the felly 136 merge by way of curved portions into three tines 140, 141 and 142 respectively that extend substantially parallel to one another. As can be seen from FIGS. 1 and 2 of the drawings, the tines 140, 141 and 142 of each group extend approximately radially of the axis of rotation of the rake wheel but are located at different levels above the ground. The free ends or tips of the three tines 140, 141 and 142 are located at approximately the same distance from the axis of rotation of the rake wheel as are the ends of the spokes 133, 134 and 135 that are furthest from the hub 131. It will be readily apparent from the preceding description and from the drawings that each spoke, tine support and tine is formed integrally from a single length of material which is preferably spring steel or other resilient wire or rod. However, it should be particularly noted that the assembly 133, 137, 140 is made from wire or rod of a larger cross-sectional diameter gauge than that of the assembly 134, 138, 141 which assembly, in turn, is formed from wire or rod of a greater cross-sectional diameter than the assembly 135, 139, 142. Although, as previously mentioned, the rake wheel shown in FIGS. 1 and 2 has eight groups of spokes and corresponding tines, a lesser number of groups such as six or four may be sufficient under certain circumstances. In the example which has been described the holes in the felly 136 through which the spokes 133, 134 and 135 of each group are entered are not equidistantly arranged from one another around the felly. In some cases, it is preferable that said holes should, in fact, be equidistantly spaced from one another around the felly 136.

In the use of a rake wheel of the kind illustrated in FIGS. 1 and 2, the tines 140 are located closest to the ground surface and will therefore be the first to make contact with the ground. Since the felly 136 is resiliently connected to the hub 131 through the intermediary of the resilient spokes 133, 134 and 135, it is capable of deflecting in directions approximately parallel to the axis of rotation of the rake wheel when one or more of the tines 140 comes into contact with uneven ground. The assemblies 133, 137, 140 are formed from the thickest gauge material in order that they can reliably effect deflection of the felly 136 and other parts of the rake wheel upon forces being exerted on the tines 140 by uneven ground surfaces. It will be apparent that the spokes 133, 134 and 135 are torsionally deformable to allow the tines 140, 141 and 142 to deflect upon meeting the ground surface. The two curved portions that are included in each assembly may also be resiliently deformable to facilitate deflection of the tines 140, 141 and 142. The substantially radial disposition of the tines 140, 141 and 142 ensures that crop which is displaced thereby is quickly shed from them by the centrifugal force generated as a result of the rotation of the wheel. The mounting of the tines is such that they tend to maintain their appointed positions but can deflect readily without breakage or damage to avoid relatively immovable obstacles which they may meet.

In the alternative rake wheel embodiment illustrated in FIGS. 3 and 4 of the drawings, there are a plurality of groups of spokes 143, 144 and 145, corresponding tine supports 146, 147 and 148 and corresponding tines 149, 150 and 151. In this case, the three spokes 143, 144 and 145 of each group are formed from spring steel wire or rod of the same cross-sectional diameter and extend nearly, but not quite, parallel to one another. The tines 149, 150 and 151 again extend substantially radially of the axis of rotation of the rake wheel when viewed in a direction parallel to that axis, each tine being contained in a plane that is substantially perpendicular to the axis of rotation. The three tine supports 146, 147 and 148 extend rearwardly and downwardly towards the ground from the felly 136' relative to the direction D and also extend generally inwardly of the rake wheel towards the axis of rotation thereof that is afforded by the shaft 124 or other member. However, as can be seen in the drawings, the tine supports overlap each other in such a way that the support 147 bears against the support 146 adjacent the junction thereof with the tine 149 whilst the support 148 bears against the support 147 adjacent the junction thereof with the tine 151. The tines 149 to 151 are capable of resilient deflection in a generally similar manner to the previously described tines 140 to 142 but, in this case, the overlapping tine supports 146, 147 and 148 afford resilient stays so that any deflecting force exerted upon one of the tines 151 is also resisted by the spokes 143 and 144 and the tine supports 146 and 147 corresponding to the other two tines 149 and 150.

In the alternative rake wheel embodiment illustrated in FIGS. 5 and 6 of the drawings, each group of spokes and tines is comprises by three spokes 152, 153 and 154, three tine supports 157, 158 and 159 and three tines 160, 161 and 162. In this case, the three holes formed in the felly 136'' are replaced by three slots which, in FIG. 6 of the drawings, open onto the lowermost edge of the felly. The spokes 152, 153 and 154 can thus be readily entered in the slots and, in order to avoid said spokes from moving out of the slots, a similarly slotted plate 156 is secured to the radially outermost side of the felly 136'' by two bolts 155. As will be apparent from the drawings, the three slots in the plate 156 open alongside the uppermost edge of the felly so that the spokes 152, 153 and 154 are effectively trapped. The three tine supports 157, 158 and 159 are entered, adjacent their curved junctions with the three tines 160, 161 and 162, through three holes in a coupling member in the form of a small plate 163. The three tine supports 157, 158 and 159 are disposed close to one another in the region of the small plate 163 but the two curved portions that interconnect the outermost two supports 157 and 159 with the corresponding tines 160 and 162 are inclined away from the center tine support 158 to some extent so that the three tines 160, 161 and 162 are spaced apart from one another by a somewhat larger distance than are their supports 157, 158 and 159 in the region of the small plate 163. As in the preceding cases, the tine supports 157, 158 and 159 are bent over downwardly and rearwardly from the felly 136'' relative to the direction D and generally inwardly towards the axis of rotation of the rake wheel that is afforded by the shaft 124 or other member. The free ends or tips of the three tines 160, 161 and 162 are located at substantially the same distance from the axis of rotation as are the ends of the corresponding spokes 152, 153 and 154 which are furthest from the hub 131. The coupling member which is afforded by the small plate 163 acts to ensure that any deflecting force which has to be resisted by one of the tines, usually the lowermost tine 160, is also resisted by the spokes and supports corresponding to the other two tines. Forces which might otherwise cause permanent deflection or breakage of a single tine are thus effectively resisted whilst the three tines maintain the approximately constant relative disposition which is desirable for effective displacement of the crop.

The rake wheel which is illustrated in FIGS. 7 and 8 of the drawings has groups of spokes and tines each comprising three very nearly parallel spokes 164, 165 and 166, three tine supports 167, 168 and 169 and three tines 170, 171 and 172. The three tine supports 167, 168 and 169 extend downwardly and rearwardly from their junctions with the three spokes 164, 165 and 166 relative to the direction D but are sbstantially tangential to an imaginary cylindrical surface whose longitudinal axis conicides with the axis of rotation of the rake wheel. As will be apparent from FIG. 8 of the drawings, the leading (relative to the direction D) tine support 167 is bent to extend rearwardly through a lesser angle than the second tine support 168 which, in turn, is bent to extend rearwardly through a lesser angle than the rearmost tine support 169. The three tines 170, 171 and 172 extend substantially radially of the axis of rotation of the rake wheel. In this case, the previously described felly 136 is replaced by a felly 173 that is formed from a plurality of strips 174. When viewed in a direction perpendicular to the axis of rotation of the rake wheel (FIG. 8) each strip 174 is inclined to the plane of the hub 131 at an angle of approximately 30°. As can be seen in FIG. 8, the strips 174 are integrally or otherwise interconnected by zig-zag strips 175 which extend generally perpendicular to the strips 174. The tine supports 167, 168 and 169 are entered through holes formed in the zig-zag strips 175 and it will be seen from FIG. 8 of the drawings that the leading and lowermost tine support 167 is of greater length than the second tine support 168 located rearwardly above it and that the latter tine support is, in turn, of greater length than the rearmost and uppermost tine support 169. Thus, the lowermost tines 170, which are normally the first to come into contact with the ground surface, are connected to the hub 131 by the longest tine supports 167 so that it is these tines which can deflect most readily upon meeting an obstruction. The strip 175 also affords a coupling member interconnecting the three tine supports 167, 168 and 169.

In the rake wheel embodiment illustrated in FIGS. 9 and 10 of the drawings, each group of spoke and tine assemblies has three non-parallel spokes 176, 177 and 178 that are entered through holes in the the previously described felly 136 adjacent their ends that are furthest from the hub 131. The spokes 176, 177 and 178 merge by way of curved portions into straight tine supports 179, 180 and 181 respectively which latter merge by way of further curved portions into three tines 182, 183 and 184. As in the previous cases, the tine supports 179, 180 and 181 are bent over downwardly and rearwardly (relative to the direction D) from the felly 136 but, in this case, when viewed in a direction parallel to the axis of rotation of the rake wheel (FIG. 9) the supports 179 and 181 extend substantially tangentially of the felly 136 while viewed in a direction perpendicular to said axis of rotation (FIG. 10), they are substantially parallel to one another and are inclined at an angle of approximately 40° to a plane containing the felly 136. The tines 182, 183 and 184 extend substantially parallel to one another and each tine is inclined at an angle of about 10° to a plane extending perpendicular to the axis of rotation of the rake wheel.

In the preceding rake wheel embodiments, the tines and their spokes have been arranged in groups of three at regular intervals around the axis of rotation of the rake wheel. However, in the embodiment illustrated in FIGS. 11 and 12 of the drawings, the tines and their spokes are mounted individually at regular intervals around said axis. Moreover, the previously described felly 136 is formed from a strip bent in such a way that the longer sides of its cross-section extend substantially parallel to the axis of rotation of the rake wheel. In this case, the strip from which the felly 185 is made is formed in such a way that the longer sides of a cross-section thereof extend substantially perpendicular to the axis of rotation. The felly 173 described with reference to FIGS. 7 and 8 of the drawings is also formed in this way. When the rake wheel is viewed in a direction perpendicular to its axis of rotation (FIG. 12) the felly 185 is spaced on appreciable distance below the hub 131.

Each individual spoke has an inner radially extending portion 186 which merges by way of a bend having a magnitude of about 100° into an outer portion 187 which is inclined rearwardly from said bend relative to the direction D. When viewed in a direction parallel to the axis of rotation of the rake wheel (FIG. 11) the bend which has just been mentioned is located quite close to the felly 185. When viewed in the same direction, the outer portion 187 of the spoke projects approximately equal distances from both the inner and the outer edge of the felly 185. The outer end of the portion 187 merges, by way of an approximately 40° bend, into a downwardly directed tine support 188. The tine support 188 then merges by way of a further approximately 40° bend, into a tine 189, the bend between the support 188 and the tine 189 being entered through a corresponding hole formed in the felly 185. The tine 189 is contained in a plane perpendicular to the axis of rotation of the rake wheel and also in a further plane that contains the spoke portion 187 and the tine support 188, said further plane being substantially parallel to the axis of rotation of the rake wheel. Only the free end or tip 190 of the tine is bent out of said further plane so as to extend substantially radially of the axis of rotation of the rake wheel and it is for this reason that the tine 189 and its support 188 cannot be seen in FIG. 11 of the drawings. The tines 189 are able to deflect satisfactorily upon meeting the ground because the felly 185 can move, against resilient opposition, in directions substantially parallel to the axis of rotation of the rake wheel. The tines 189 can also move in other directions against the resilient opposition which is produced upon torsional deformation of the supports 188 and spokes 186, 187.

In the rake wheel embodiment illustrated in FIGS. 13 and 14 of the drawings, the tines and their spokes are once again arranged in groups of three. Each group has three spokes 197, 198 and 199, three tine supports 200, 201 and 202 and three tines 203, 204 and 205. However, as in the preceding case, the felly of the rake wheel is spaced beneath the hub 131 when the rake wheel is viewed in a direction perpendicular to its axis of rotation (FIG. 14). As can be seen in FIGS. 13 and 14, the felly comprises a plurality of lower coplanar portions 191, a plurality of upper coplanar portions 193 that are parallel to the portions 191 and a plurality of interconnecting portions 192 that are inclined to the vertical and to the horizontal. Each upper portion 193 carries an upwardly inclined arm 194 from which two apertured lugs 195 and 196 project at different levels. The apertured lug 195 is located equidistantly between the upper portion 193 of the felly and the apertured lug 196.

The tine supports 200, 201 and 202 extend parallel to the axis of rotation of the rake wheel and the support 200, which is the foremost relative to the direction D, is longer than the support 201 which, in turn, is longer than the support 202. The lowermost end of the support 200 is entered through a hole in the portion 193 of the felly whilst the support 201 is entered through the hole in the lug 195 and the support 202 is entered through the hole in the lug 196. The three tines 203, 204 and 205 are contained in planes that are substantially perpendicular to the axis of rotation of the rake wheel, each of said tines being inclined rearwardly (relative to the direction D) from the felly at an angle of about 50° when the rake wheel is viewed in a direction parallel to its axis of rotation (FIG. 13). The free ends or tips of the three tines 203, 204 and 205 are bent forwardly (with respect to the direction D) relative to the remainders of the tines in such a way that angles of about 140° are enclosed between said tips and the remainders of the tines. Once again, the support 200 of the lowermost tine 203 is the longest and can therefore be torsionally deformed most readily while the three tines are coupled to one another by the parts 193 to 196. The whole felly is also capable of deflecting in directions substantially parallel to the axis of rotation of the rake wheel as a result of the resilient construction of the spokes 197, 198 and 199.

In the rake wheel embodiment illustrated in FIGS. 15 and 16 of the drawings, the spokes and tines are arranged in pairs and the felly is formed from spring steel rod. Each assembly includes two spokes 210 and 211, two tine supports 212 and 213 and two tines 216 and 217, the tines being connected to the respective supports by curved portions 214 and 215. The felly is afforded by a plurality of straight relatively inclined portion 206 that are interconnected by short intermediate portions 207. Coupling members in the form of plates 208 are secured to the intermediate portions 207 by bolts 209. As will be evident from the drawings, the tine supports 212 are located closer to the centre of the rake wheel than are the tine supports 213, the supports 212 and 213 being inclined to the spokes 210 and 211 in FIG. 29. The tines 216 and 217 extend approximately radially of the rake wheel and the curved portions 214 and 215 by which they are connected to the supports 212 and 213 are entered through holes formed in the plates 208. As can be seen in FIG. 16 of the drawings, the uppermost end of each curved portion is directed away from the corresponding tine support in a direction towards the axis of rotation of the rake wheel whilst the lowermost end thereof extends in a relatively opposite direction. The plates 208 tend to maintain the tines 216 and 217 in their appointed positions relative to one another which positions are such that the tip of each tine 216 is located appreciably closer to the axis of rotation of the rake wheel than is the tip of each tine 217. This particular rake wheel is extremely resilient due to the formation of the felly from spring steel rod.

In the rake wheel embodiment which is illustrated in FIGS. 17 and 18 of the drawings, the spokes and tines are arranged in groups of four. Each group includes four spokes 219, 220, 221 and 222, four tine supports 223, 224, 225 and 226 and four tines 227, 228, 229 and 230. As can be seen in FIG. 18 of the drawings, the felly 136'' is located a short distance below the level of the hub 131 and carries a coupling member in the form of an apertured lug 218 in respect of each group of spokes and tines. There are four holes in each lug 218, the centres of all four holes being contained in a plane which also contains the axis of rotation of the rake wheel. The spokes 219 to 222 are entered through the holes at their junctions with the corresponding tine supports 223 to 226 which latter descend obliquely downwardly at steeper angles than the spokes. As can be seen in FIG. 18 of the drawings, the tine support 223 is the shortest and is the most gently inclined to the horizontal whilst the support 226 is the longest and the most steeply inclined to the horizontal. Each of the tines 227 to 230 is contained in a corresponding plane perpendicular to the axis of rotation of the rake wheel and the four tines are equally spaced one above the other although, as can be seen in FIG. 17, they are not in strict vertical register. Each individual assembly of a spoke, a tine support and a tine such as, for example, the assembly 219, 223 and 227 is contained in a corresponding plane that is parallel to the axis of rotation of the rake wheel when the rake wheel is viewed in the direction of FIG. 17. None of the tines 227 to 230 is exactly radial in extent. When viewed in the direction of FIG. 17 and with respect to the radial plane which contains the axis of rotation of the rake wheel and the four holes formed in the lug 218, the two tines 227 and 228 are inclined slightly rearwardly (relative to the direction D) of said plane while the two tines 229 and 230 are inclined slightly forwardly. The inclinations of the tines 227 and 230 are, obviously, slightly greater than those of the two tines 228 and 229. The lowest tine 230 has the longest supports 226 and can thus deflect more readily than the others while the apertured lug 218 tends to maintain the four tines in constant positions relative to one another.

In the rake wheel embodiment illustrated in FIGS. 19 and 20 of the drawings, the tines and their spokes are arranged in pairs or groups of two. Each assembly comprises two substantially radial spokes 231 and 232 which are entered through holes in the felly 136'' and which, at the radially outer side of the felly, merge by way of 90° bends into two tines 233 and 234 respectively that extend parallel to the axis of rotation of the rake wheel. The tine 233 which is the leading one relative to the direction D is located closer to the axis of rotation than is the tine 234.

The rake wheel illustrated in FIGS. 21 and 22 once again has groups of three spoke and tine assembles. Each group comprises three spokes 235, 236 and 237, three tine supports 238, 239 and 240 and three tines 241, 242 and 243. The three spokes 235 and 237 are entered through holes in the felly 136' adjacent their junctions with the tine supports 238 and 240. The supports 238, 239 and 240 extend downwardly and rearwardly from the felly 136 relative to the direction D and, as can be seen in the drawings, are coupled to one another by being mutually twisted at a point a short distance beyond the radially outer side of the felly 136'. The three tines 241, 242 and 243 are all steeply inclined rearwardly relative to the direction D but at different degrees of inclination, the distances between the tips of the tines 232 and 241 and the tip of the intervening tine 242 being substantially equal.

The rake wheel embodiment illustrated in FIGS. 23 and 24 of the drawings has spoke and tine assemblies that are arranged in pairs or groups of two. Each group comprises two spokes 244 and 245, two tine supports 246 and 247, two tines 250 and 251 and two curved portions 248 and 249 that integrally interconnected the support 246 and the tine 250 and the support 247 and the tine 251 respectively. As can be seen in the drawings, all the parts 244 to 251 that have just been mentioned are contained in a single vertical plane which also contains the axis of rotation of the rake wheel so that only the part 244 is visible in the upper region of FIG. 23. It will also be apparent from the drawings that the assembly 244, 246, 248, 250 is formed from wire or rod of a thicker cross-sectional gauge than the assembly 245, 247, 249, 251. Angles of about 45° are enclosed between the spokes 244 and 245 and the tine supports 246 and 247 so that the latter are inclined inwardly towards the axis of rotation of the rake wheel from the radially outermost extremities of the spokes 244 and 245. Angles of about 150° are enclosed between the lowermost ends of the tine supports 246 and 247 and the uppermost ends of the curved portions 248 and 249. The rake wheel includes an annular strip-shaped felly 253 that is located beneath the hub 131, said felly carrying a coupling member in the form of a radially extending apertured strip 252 in respect of each spoke and tine assembly. The curved portions 248 and 249 are entered through the holes formed in the strip 252, the portion 248 passing through a hole that is located radially outwardly of the felly 253 whilst the portion 249 is entered through a hole located radially inwardly of said felly. The tines 250 and 251 are in line with one another when viewed in a radial direction. This form of rake wheel is particularly suitable for use in an implement in which the rake wheels should be capable of operative rotation in either of two relatively opposite directions.

In the rake wheel embodiment which is illustrated in FIGS. 25 and 26 of the drawings, there are single spokes 254 formed from rigid tubular material, the radially innermost ends of said spokes being welded or otherwise secured to the hub 131. When viewed in a direction parallel to the axis of rotation of the rake wheel (FIG. 25), the spokes 254 extend radially whereas, when viewed in a radial direction (FIG. 26), the spokes 254 are inclined gently upwardly from the hub 131. The radially outermost ends 255 of the spokes 254 are bent over forwardly relative to the direction D. When seen in the direction of FIG. 25, each end 255 extends substantially perpendicular to the remainder of the spoke 254 whilst, when viewed in the direction of FIG. 26, each end 255 is inclined at an angle of approximately 45° to the axis of rotation of the rake wheel.

Each end 255 is surrounded by two multiple coils 256 and 257 of spring steel wire or rod, the integral junction between said coils being clamped firmly to the end 255 by a bolt 258 that is entered transversely through said end. The relatively remote ends of the two coils 256 and 257 merge into straight tine supports 259 and 260 respectively and these supports, in turn, terminate in tines 261 and 262. As can be seen in the drawings, the supports 259 and 260 extend perpendicularly from the end 255 whilst the tines 261 and 262 are, in turn, bent over slightly rearwardly from their supports relative to the direction D. The tine 261 is located over and above the tine 262 in a single plane that extends parallel to the axis of rotation of the rake wheel.

In the use of the rake wheel illustrated in FIGS. 25 and 26 of the drawings, the tines 261 and 262 can turn about the axis afforded by the end 255 and the coils 256 and 257 against the resilient opposition of the coils 256 and 257 by temporarily tightening or loosening those coils. The tines can also deflect readily in a direction substantially parallel to the axis of rotation of the rake wheel by resilient bending of the supports 259 and 260 so that said tines can deflect readily upon meeting the ground or obstacles thereon while normally maintaining their correct dispositions for displacing crop.

What is claimed is:

1. A mechanically drivable rake wheel member comprising a hub mountable for operative rotation about a non-horizontal axis, a felly concentric with said hub and spaced therefrom and including aperture means, a plurality of spokes connected at one end to said hub and connected to torsionally deformable supports which interconnect with a plurality of rake tines having free outer ends, the outer ends of said tines extending substantially radially with respect to the axis of rotation and said tines, at least in part, extending rearwardly from said supports with respect to the intended direction of rotation of the rake wheel during operation thereof, said tines extending substantially in a plane perpendicular to the axis of rotation of the rake wheel, the inner ends of said tines being connected to said supports and said supports being inclined to said plane, the connected tines and supports being loosely held by said aperture means and said tines being deflectable and turnable upwardly relative to the remainder of the rake wheel against resilient opposition during rotation of said rake wheel member over ground undulations, whereby the tines do not penetrate the ground.

2. A rake wheel as claimed in claim 1 wherein at least one tine is formed integrally with its tine support and spoke from a single length of spring steel.

3. A rake wheel as claimed in claim 1, wherein at least one tine and its corresponding spoke are contained in a single plane.

4. A rake wheel as claimed in claim 1, wherein, when viewed in a direction parallel to the axis of rotation of said rake wheel, each spoke at least in part extends tangentially to a circle whose center is coincident with the axis of rotation of said rake wheel.

5. A rake wheel as claimed in claim 1, wherein when viewed in a direction parallel to the axis of rotation of said rake wheel, each tine is located in register with its corresponding spoke.

6. A rake wheel as claimed in claim 1, wherein said tines are arranged in groups and at least one spoke corresponding to one of said tines of a group has a greater cross-sectional gauge than other spokes corresponding to the tines of that group.

7. A rake wheel as claimed in claim 1, wherein said tines are arranged in groups and all tines of one group are interconnected by a rigid coupling member, said coupling member being connected to a flexible felly.

8. A rake wheel as claimed in claim 7, wherein, when said rake wheel is viewed in a direction parallel to its axis of rotation, said tines are bent over rearwardly from their supports relative to the direction of rotation of said rake wheel.

9. A rake wheel a claimed in claim 7, wherein the free end of each tine is bent over relative to the remainder of said tine to extend substantially radially of said rake wheel.

10. A rake wheel as claimed in claim 7, wherein said tines are arranged in groups and said tines of one group are located one above the other when viewed in a radial direction.

11. A rake wheel as claimed in claim 10, wherein when said rake wheel is viewed in a direction parallel to its axis of rotation, one of said tines of a group is located in front, relative to the direction of rotation of said rake wheel, of another tine of that group which is located at a higher level.

12. A rake wheel as claimed in claim 1, wherein said tines are arranged in groups and the free ends of all tines of one group are located at different distances from the axis of rotation of said rake wheel and wherein the free end of the lowermost tine of one group is located further from said axis of rotation than that of a higher tine of the same group.

13. A rake wheel as claimed in claim 1, wherein the junctions between said spokes and said tine supports are located further from the axis of rotation of said rake wheel than the junctions between said tine supports and said tines.

14. A rake wheel as claimed in claim 1, wherein at least one tine is formed integrally with its tine support and spoke from a single length of spring steel and at least one tine and its corresponding spoke are contained in a single plane, said plane also containing said corresponding tine support.

15. A rake wheel as claimed in claim 1, wherein said tines are interconnected by a felly, said felly interconnecting said tines by coupling the corresponding spokes to one another at locations adjacent those at which said spokes are connected to their respective tine supports, said spokes being entered through holes formed in said felly.

16. A rake wheel as claimed in claim 15, wherein said tines are interconnected to a felly and said felly interconnects said tine supports at locations adjacent those at which said supports are connected to said tines, and wherein said tine supports are entered through holes formed in said felly, said supports being entered through holes formed in plates fastened to said felly.

17. A rake wheel as claimed in claim 1, wherein said tines are arranged in groups and said tines of one group are located one above the other when viewed in a radial direction, and wherein, when said rake wheel is viewed in a direction parallel to its axis of rotation, one of the tines of a group is located in front, relative to the intended direction of rotation of the rake wheel, of another tine of that group which is located at a higher level.

18. A rake wheel as claimed in claim 1, wherein said tines are arranged in groups and the free ends of all the tines of one group are located at different distances from the axis of rotation of said rake wheel, the free end of the lowermost tine of one group being located further from said axis of rotation than that of a higher tine of the same group.

19. A rake wheel as claimed in claim 1, wherein the junctions between said spokes and said tine supports are located further from the axis of rotation of said rake wheel than are the free ends of said tines.

20. A rake wheel as claimed in claim 1, wherein said tines are arranged in groups and the tine support corresponding to the lowermost tine of each group is of greater length than the tine supports of the other tines of each respective group.

21. A rake wheel as claimed in claim 1, wherein, when viewed in a direction perpendicular to the axis of rotation of said rake wheel, said spokes are bent.

22. A rake wheel as claimed in claim 21, wherein a part of said spokes is adjacent said felly to converge with the axis of rotation of said wheel when viewed in the direction from said hub to said felly.

23. A rake wheel as claimed in claim 1, wherein said supports extend through said felly in a downward direction.

* * * * *